(12) United States Patent
Farrenkopf (10) Patent No.: US 6,515,460 B1
(45) Date of Patent: Feb. 4, 2003

(54) MULTIPHASE SWITCHING REGULATOR CONTROL ARCHITECTURE FOR LOW ON TIME SYSTEMS THAT ENFORCES CURRENT SHARING

(75) Inventor: Douglas Farrenkopf, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/953,387

(22) Filed: Sep. 10, 2001

(51) Int. Cl.[7] .............................................. G05F 1/40
(52) U.S. Cl. ...................................... 323/272; 323/285
(58) Field of Search ................................ 323/272, 282, 323/283, 284, 285, 286, 269; 363/56.11, 72, 71, 65

(56) References Cited

U.S. PATENT DOCUMENTS 5,808,453 A * 9/1998 Lee et al. .................... 323/224
6,144,194 A * 11/2000 Varga .......................... 323/285

OTHER PUBLICATIONS

Forsyth, A.J. et al., "Small–Signal Modeling and Control of the Quasi–Square Wave Boost Converter;" *IEEE Transactions on Power Electronics* 13:1 (Jan. 1998), pp. 36–46.

Braga, H. et al., "A 3–kW Unity–Power–Factor Rectifier Based on a Two–Cell Boost Converter Using a New Parallel–Connection Technique;" *IEEE Transactions on Power Electronics* 14:1 (Jan. 1999), pp. 209–217.

Hofer–Noser, P. et al., "Monitoring of Paralleled IGBT/Diode Modules;" *IEEE Transactions on Power Electronics* 14:3 (May 1999), pp. 438–444.

Garcerá, G. et al., "Novel Three–Controller Average Current Mode Control of DC–DC PWM Converters with Improved Robustness and Dynamic Response;" *IEEE Transactions on Power Electronics* 15:3 (May 2000), pp. 516–528.

* cited by examiner

Primary Examiner—Rajnikant B. Patel
(74) Attorney, Agent, or Firm—Merchant & Gould P.C.; Timothy P. Sullivan (57) ABSTRACT

An apparatus and method that enforces current sharing and provides low on times for a multiphase voltage mode regulator has been described. A current level is sensed for each leg of the multiphase regulator. The sensed current level relates to the inductor current level for each of the phases. An average current level is determined from the sensed current levels. A comparison is then made between the sensed current levels and the average current level. In response to the comparison, the current level for the leg is adjusted. According to one embodiment, the on time for the switch of the phase is adjusted. The switch is adjusted to a shorter or longer time when the phase signal level is not equal to the average current level. The apparatus and method work with as few as 2-phases, or as many as N-phases.

19 Claims, 13 Drawing Sheets

MULTIPHASE SWITCHING REGULATOR CONTROL ARCHITECTURE FOR LOW ON TIME SYSTEMS THAT ENFORCES CURRENT SHARING

FIELD OF THE INVENTION

The present invention is related to electronics, and more specifically to a multiphase switching regulator control architecture that enforces current sharing.

BACKGROUND OF THE INVENTION

Electronic circuits are designed to operate off a supply voltage that is typically assumed to be constant. The supply voltage may be provided by a voltage regulator that is designed and intended to supply a constant DC output voltage regardless of changes in load current or input voltage.

One type of voltage regulator, a multiphase buck switching regulator, is often used when the load current is very high. Each switch within the multiphase buck switching regulator carries less current since each phase has its own switch. As a result, less expensive smaller switches, as opposed to one large switch, may be used within the system. Other benefits of multiphase switching systems include lower output voltage ripple and less abrupt input current variation when compared to single-phase regulator systems.

SUMMARY OF THE INVENTION

The present invention is directed at providing a multiphase switching regulator control architecture that enforces current sharing and has low on time.

According to one aspect of the invention, current sharing is enforced across all of the phases of the switching regulator control architecture. Current is equalized across each phase helping to ensure that one phase's current does not drift higher or lower than the other phases current levels.

According to another aspect of the invention, the inductor current level for each phase is sensed. An average current level for all of the phases is also determined. Each phase's sensed current level is compared to the average current level. When the phase's sensed current level is not equal to the average current level, the phase's current level is adjusted. The current level for the phase may be adjusted higher or lower by changing the switch's on time for the phase.

According to another aspect of the invention, low on times for the switches are capable. The multiphase switching regulator uses voltage mode control helping to ensure low on times.

According to yet another aspect of the invention a method is provided for enforcing current sharing among all of the phases. Each phase's current level is compared to an average current for all of the phases and if not equal the phase's current level is adjusted.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "on time" means the time a switch is coupled to VIN.

Figure 1:
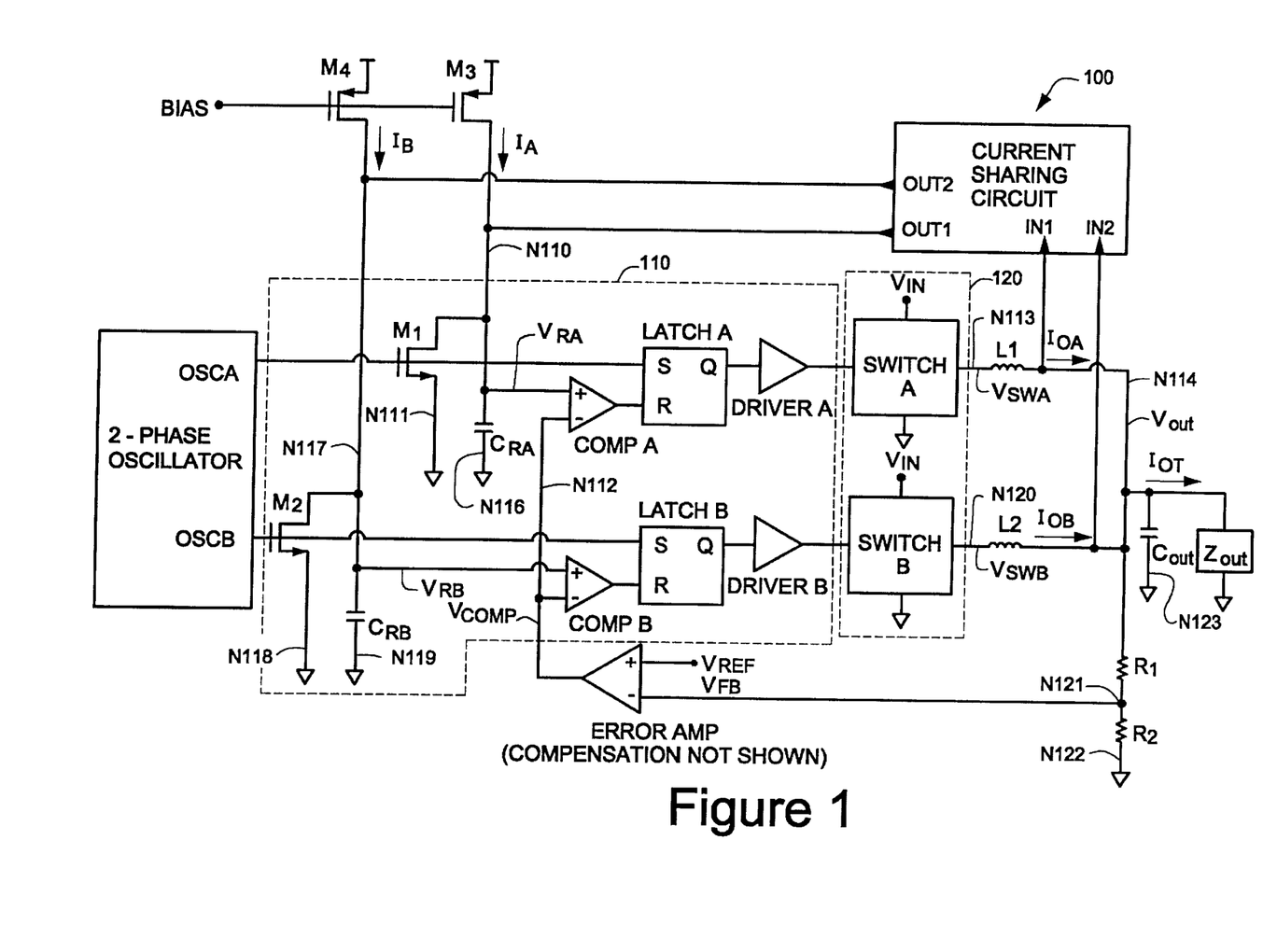
FIG. 1 illustrates a two-phase voltage mode buck switching regulator architecture that enforces current sharing.

FIG. 1 shows a 2-phase voltage mode buck switching regulator architecture that enforces current sharing, in accordance with aspects of the invention. As shown in the figure, 2-phase regulator architecture 100 includes 2-phase oscillator, control circuit 110, switching circuit 120, transistors M3 and M4, inductors L1 and L2, resistors R1 and R2, capacitor $C_{OUT}$, amplifier circuit Error Amp, and current sharing circuit. Control circuit 110 includes transistors M1 and M2, capacitors $C_{RA}$ and $C_{RB}$, comparators CompA and CompB, latches LatchA and LatchB, and drivers DriverA and Driver B. Switching circuit 120 includes switches SwitchA and SwitchB.

2-Phase oscillator has an output (OSCA) coupled to the gate of transistor M1 and coupled to the S input of LatchA and an output (OSCB) coupled to the gate of transistor M2 and coupled to the S input of LatchB. Transistor M1 has a drain coupled to node N1110, a source coupled to node N111, and a gate coupled to output OSCA of 2-Phase oscillator. Capacitor circuit $C_{RA}$ is coupled between node N110 and node N116. Comparator circuit CompA has a non-inverting input (+) coupled to node N110, an inverting input (−) coupled to node N112 and an output coupled to the R input of LatchA. DriverA has an input coupled to output Q of LatchA and an output coupled to SwitchA. SwitchA has an input coupled to $V_{IN}$, an input coupled to the output of DriverA, an output couple to ground, and an output coupled to node N113. Inductor L1 is coupled between node N113 and node N114.

Transistor M2 has a drain coupled to node N117, a source coupled to node N118, and a gate coupled to output OSCB of 2-Phase oscillator. Capacitor circuit $C_{RB}$ is coupled between node N117 and node N119. Comparator circuit CompB has a non-inverting input (+) coupled to node N117, an inverting input (−) coupled to node N112 and an output coupled to the R input of LatchB. DriverB has an input coupled to output Q of LatchB and an output coupled to SwitchB. SwitchB has an input coupled to $V_{IN}$, an input coupled to the output of DriverB, an output coupled to ground, and an output coupled to node N120. Inductor L2 is coupled between node N120 and node N114.

Resistor R1 is coupled between node N114 and node N121. Resistor R2 is coupled between node N121 and node N122. Amplifier circuit Error Amp has a non-inverting input (+) coupled to $V_{REF}$, an inverting input (−) coupled to node N121, and an output coupled to node N112. $C_{OUT}$ is coupled between node N114 and node N123. Nodes N111, N116, N118, N119, and N123 are coupled to ground. Transistor M3 has a source coupled to a supply signal, a gate coupled to a bias signal, and a drain coupled to node N110. Transistor M4 has a source coupled to a supply signal, a gate coupled to a bias signal, and a drain coupled to node N117.

Current sharing circuit has an input (IN1) coupled to node N114 near inductor L1, an input (IN2) coupled to node N114 near inductor L2, an output (OUT1) coupled to node N110, and an output (OUT2) coupled to node N117.

The basic operation of 2-phase regulator architecture 100 will now be described. While a continuous mode will be assumed throughout the exemplary description, a discontinuous mode may also be used. 2-phase oscillator produces oscillation signals at outputs OSCA and OSCB (See FIGS. 2A and 2B for exemplary waveforms). The output pulses of the oscillation signals produced at outputs OSCA and OSCB are 180 degrees out of phase with respect to each other. Transistors M3 and M4 are arranged as current sources and produce currents $I_A$ and $I_B$ at nodes N110 and N117, respectively. Control circuit 110 produces a first control signal and a second control signal to control switch circuit 120. Switching circuit 120 is arranged to receive the first control signal and second control signal. In response to the first control signal, a first signal is coupled to node N113. In response to the second control signal, a second signal is coupled to node N120.

More specifically, current source M3 produces current $I_A$ that charges capacitor $C_{RA}$ and current source M4 produces current $I_B$ that charges capacitor $C_{RB}$ causing the voltages $V_{RA}$ and $V_{RB}$ to be voltage ramps. The waveforms of voltages $V_{RA}$ and $V_{RB}$ are triangular saw-tooth waveforms 180 degrees out of phase (See FIGS. 2C and 2D for exemplary waveforms). Transistors M1 and M2 are arranged as switches and are controlled by the oscillation signals output by 2-phase oscillator at outputs OSCA and OSCB, respectively. According to one embodiment of the invention, capacitor $C_{RA}$ is discharged when oscillation signal OSCA is a logical high ("1"). Similarly, capacitor $C_{RB}$ is discharged when oscillation signal OSCB is a logical high ("1").

For exemplary purposes, assume that the error signal voltage ($V_{COMP}$) produced by Error Amp at node N112 is set at one-half the peak voltage of the voltage $V_{RA}$ and $V_{RB}$ ramps. The voltage $V_{SWA}$ coupled by SwitchA will now be discussed. LatchA is set when pulse at output OSCA is a logical high. In response to LatchA being set, Q of LatchA goes to a logical high, which causes SwitchA to turn on via a control signal produced by DriverA. When SwitchA turns on, $V_{SWA}$ is equal to $V_{IN}$. As discussed above, when the oscillation signal at output OSCA is a logical high, transistor M1 turns on and causes capacitor $C_{RA}$ to discharge. In response to capacitor $C_{RA}$ discharging, voltage $V_{RA}$ received by the non-inverting input of CompA begins ramping up. Voltage $V_{RA}$ ramps up until LatchA is reset. LatchA is reset by a reset signal produced by CompA when comparator CompA determines voltage $V_{RA}$ is equal to voltage $V_{COMP}$. In response to LatchA being reset, a driver signal that is a logical low ("0") is produced at the Q output of LatchA causing SwitchA to turn off, or decouple $V_{IN}$. The driver signal voltage $V_{SWA}$, which is a pulse waveform, goes to zero volts when SwitchA is turned off (See FIG. 2E for an exemplary $V_{SWA}$ waveform). Since, in the present example, $V_{COMP}$ is set at one-half of the $V_{RA}$ ramp, $V_{RA}$ is equal to $V_{IN}$ half of the time, and $V_{RA}$ is equal to zero volts the other half of the time. When SwitchA is on, it couples voltage $V_{IN}$ to node N113. SwitchA is coupled to ground when it is off. Switch A can be connected to ground either with a second switch or with a free wheeling diode.

Voltage $V_{SWB}$ is produced similarly to voltage $V_{SWA}$. $V_{SWB}$ is a pulsed waveform that is 180 degrees out of phase with respect to voltage $V_{SWA}$ (See FIG. 2F for an exemplary waveform). When voltage $V_{SWA}$ is high, voltage $V_{SWB}$ is low, and when voltage $V_{SWA}$ is low, voltage $V_{SWB}$ is high.

When voltage $V_{SWA}$ is equal to voltage $V_{IN}$, current $I_{OA}$ at node N114 ramps up with a slope of $(V_{IN}-V_{OUT})/L1$. $V_{OUT}$ is the regulated voltage. When $V_{SWA}$ is equal to zero volts, current $I_{OA}$ ramps down with a slope of $(-V_{OUT}/L1)$. Similarly, when voltage $V_{SWB}$ is equal to voltage $V_{IN}$, current $I_{OB}$ at node N114 ramps up with a slope of $(V_{IN}-V_{OUT})/L2$. When $V_{SWB}$ is equal to zero volts, current $I_{OB}$ ramps down with a slope of $(-V_{OUT}/L2)$. Currents $I_{OA}$ and $I_{OB}$ are thus triangular waveforms 180 degrees out of phase (See FIG. 2G for an exemplary waveform).

The current sharing circuit (Current Sharing Circuit) senses the inductor current for each phase of the oscillator. The current sharing circuit compares the sensed inductor current to the average inductor currents for all of the phases and produces a compensation signal for each phase. Each phase's compensation signal relates to an amount to adjust each phase's current level. According to one embodiment of the invention, a phase's switch on time, or duty cycle, is adjusted when the sensed current for the phase is not equal to the average current. The switch's on time is adjusted by affecting the current levels at node N110 and/or node N117. For example, according to one embodiment of the invention, when the sensed current for the first phase is higher than the average current, the signal at node N110 will increase resulting in SwitchA's on time to decrease and be less than the on time for SwitchB. The longer a switches on time, the more its inductor current increases. The operation of the current sharing circuit will be described in more detail below.

Up to now, in the exemplary discussion it was assumed that $V_{COMP}$ was set at one half the peak voltage of the $V_{RA}/V_{RB}$ ramps. In a closed loop configuration, the loop will set $V_{COMP}$ to a voltage such that $V_{FB}$ is equal to $V_{REF}$. Setting $V_{FB}$ equal to $V_{REF}$ regulates $V_{OUT}$. The $V_{SWA}/V_{SWB}$ pulse widths are set to provide the desired $V_{OUT}$.

One way to insure equal current sharing among the different inductors in a multiphase system is to use current mode control. However, current mode control does not allow for low switch on times. This is because with current mode control, a switch is turned on by a set pulse, and then turned off when a feedback-controlled current is reached. The fact that an off-chip current measurement must be made, especially in the presence of switching noise, before resetting the switch makes it difficult to achieve on times less than approximately a couple of hundred nanoseconds. Voltage mode control, on the other hand, does not have this drawback. The present invention is directed at providing voltage mode control having low on times that enforces current sharing among the different legs.

Figure 2A:
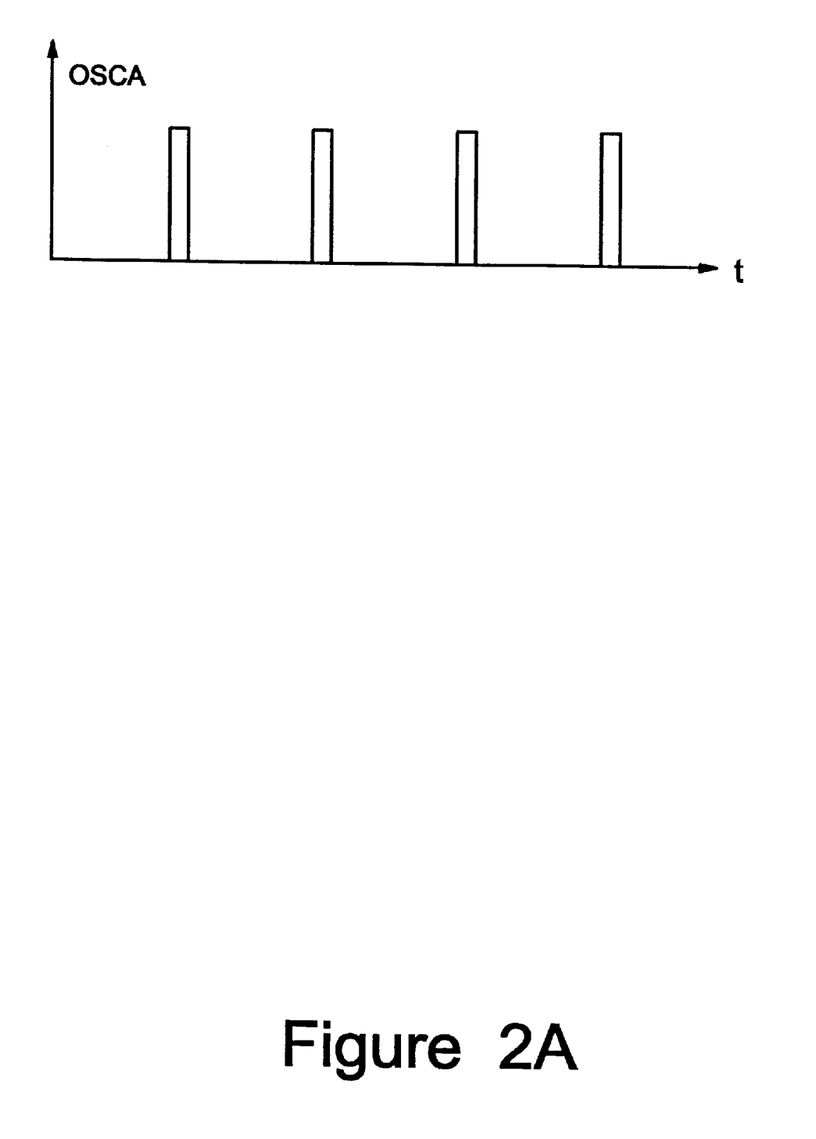
FIGS. 2A–2H illustrate exemplary waveforms for a switching regulator.
Figure 2B:
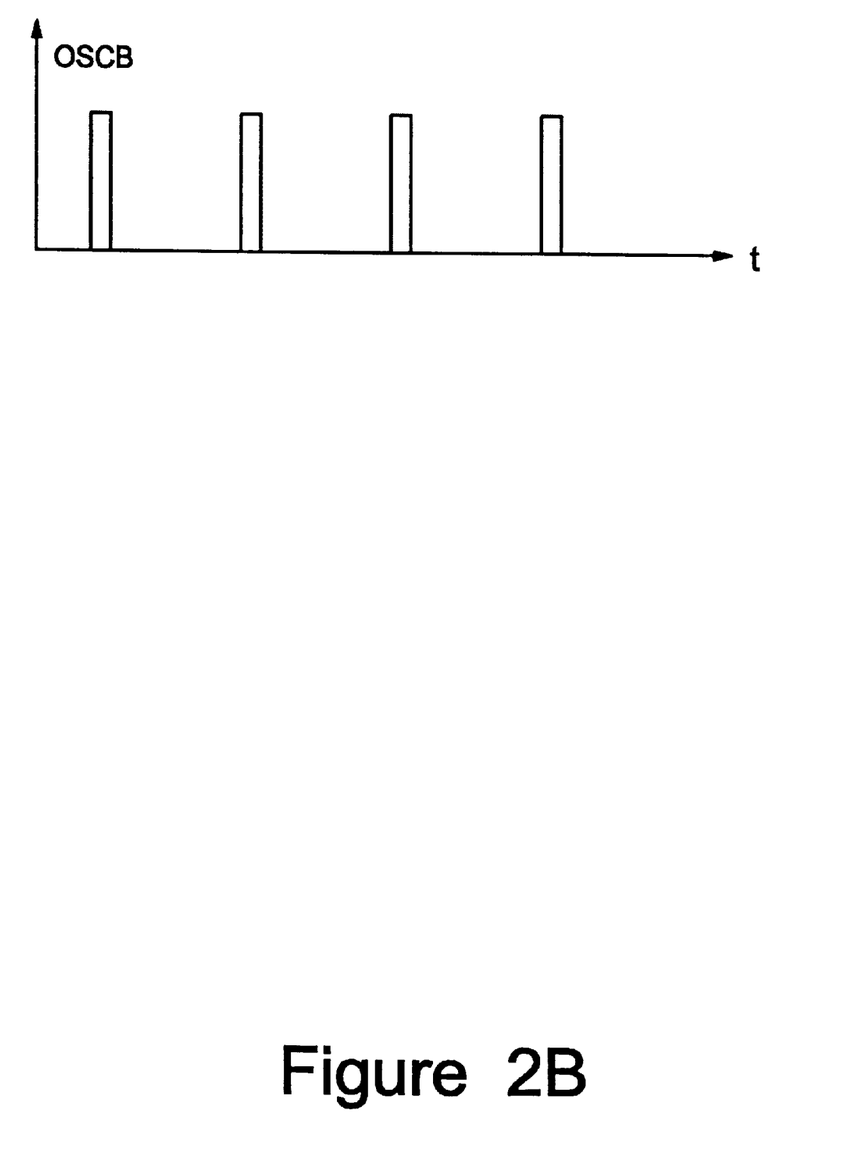

FIGS. 2A–2H illustrate exemplary waveforms relating to a multiphase regulator. FIG. 2A illustrates the output (OSCA) of the first phase of the 2-phase oscillator over time. FIG. 2B illustrates the output (OSCB) of the second phase of the 2-phase oscillator. The 2-phase oscillator illustrated in FIG. 1 may be set to produce the desired pulses to control the charging and discharging of capacitor circuits $C_{RA}$ and $C_{RB}$ and switching of switch circuits (SwitchA and SwitchB).

Figure 2C:
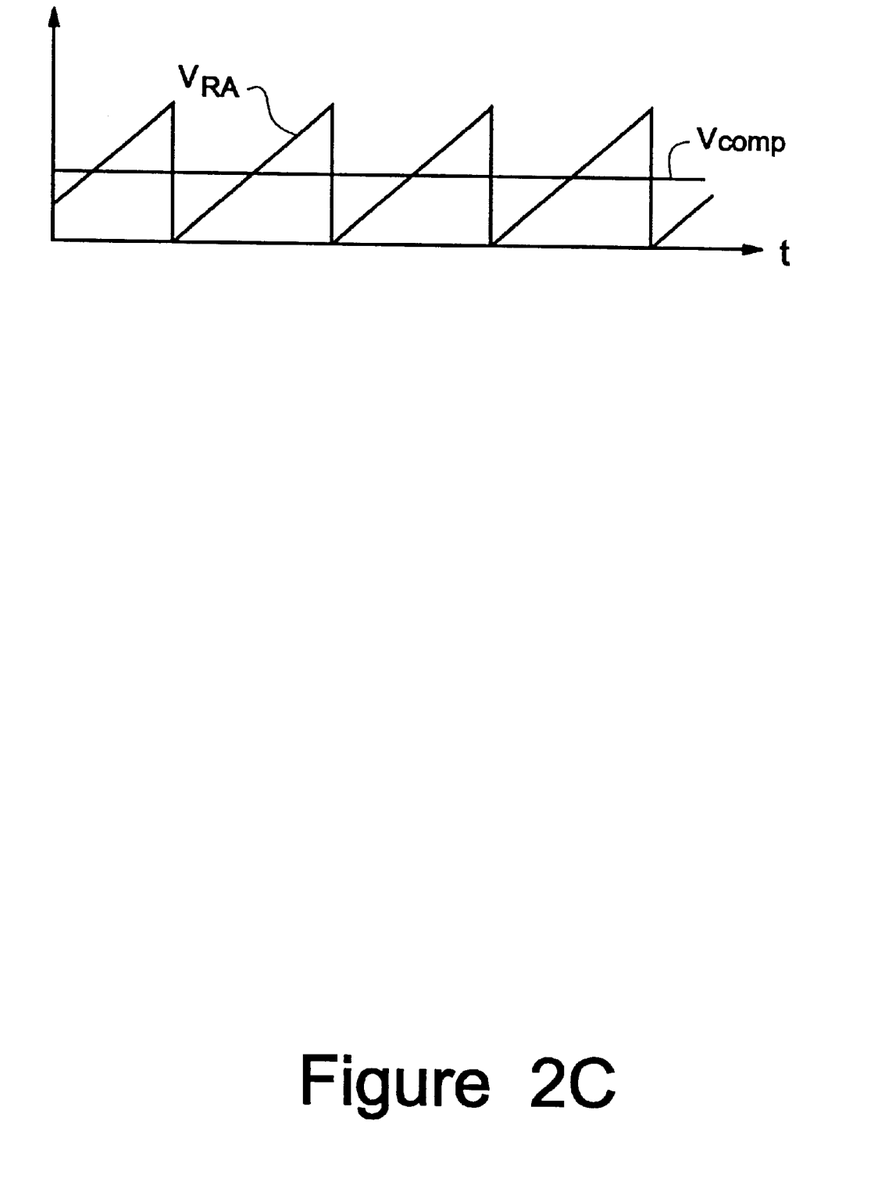
Figure 2D:
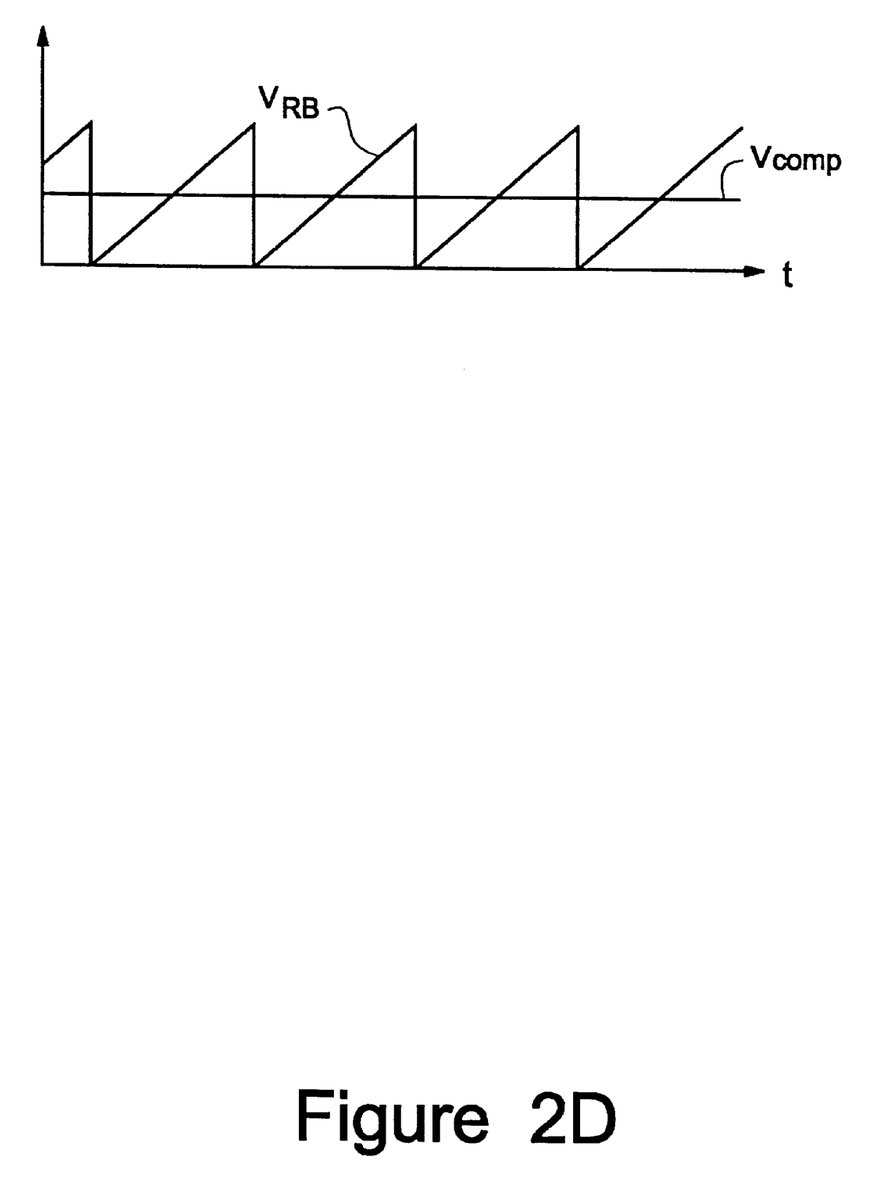

FIGS. 2C and 2D illustrate exemplary waveforms of the voltages $V_{RA}$ and $V_{RB}$. The waveforms illustrated by FIGS. 2C and 2D are triangular saw-tooth waveforms that are 180 degrees out of phase to each other.

Figure 2E:
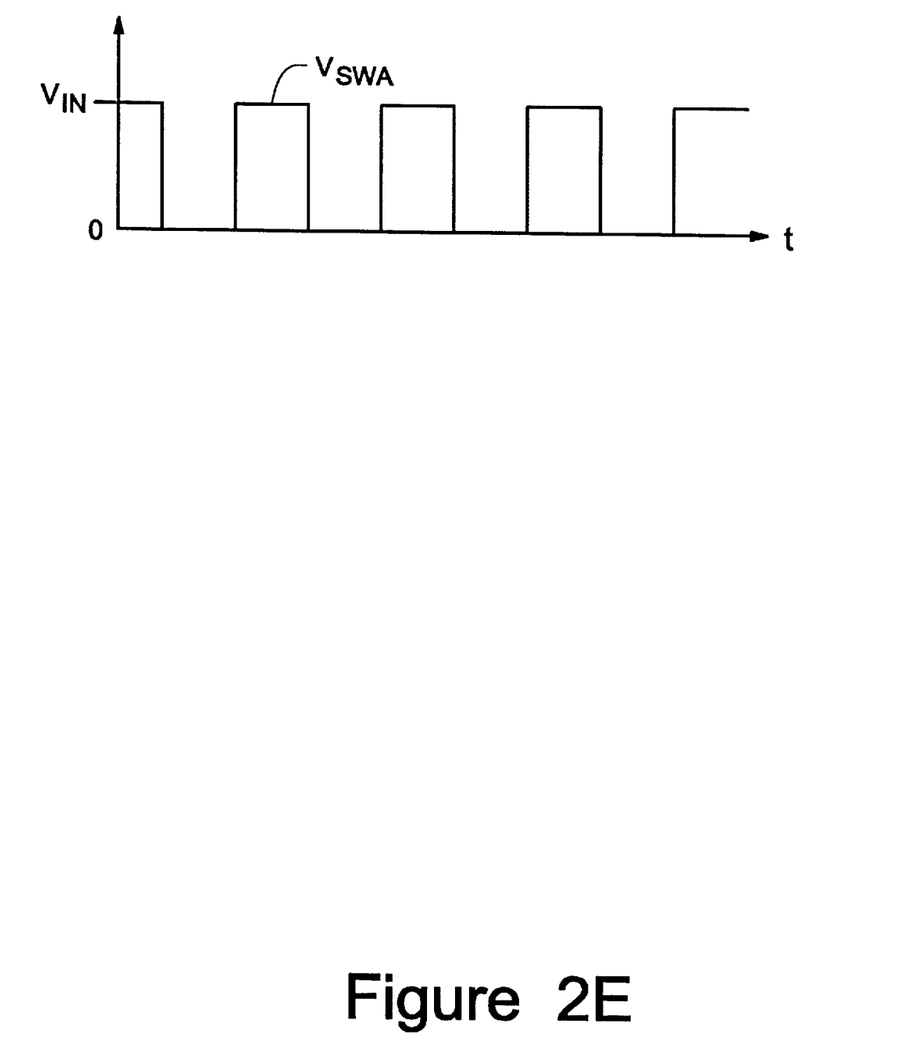
Figure 2F:
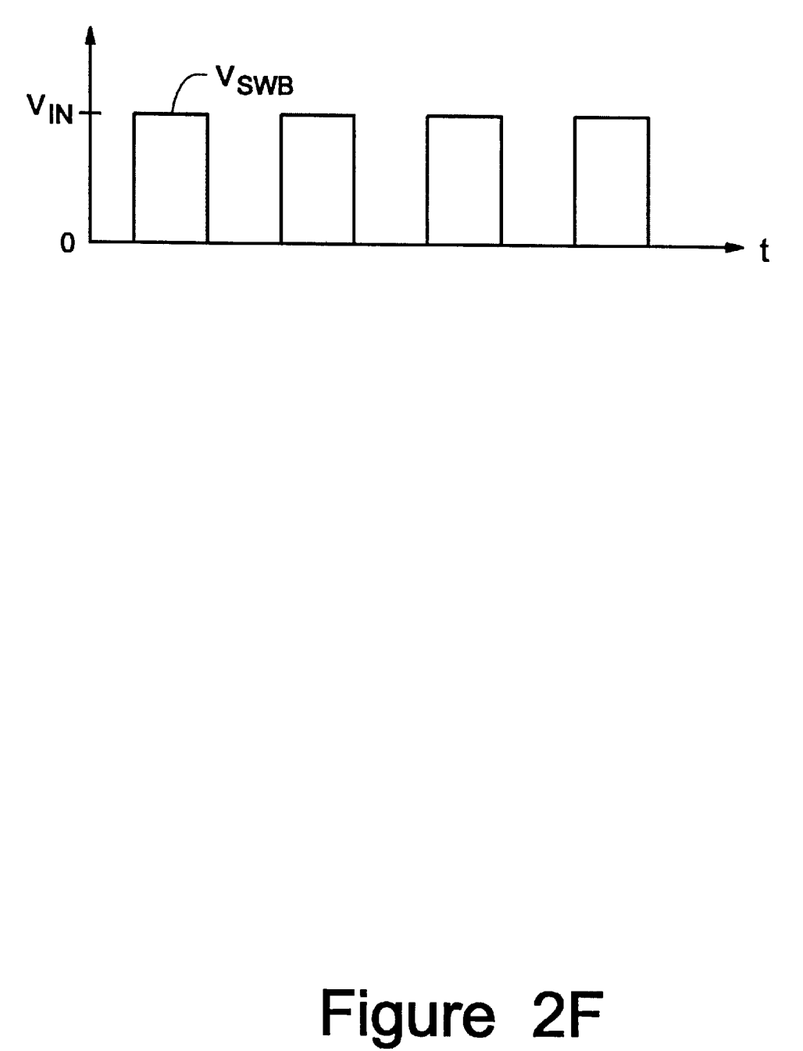

FIGS. 2E and 2F show exemplary waveforms of the switching voltages ($V_{SWA}$ and $V_{SWB}$) for a 2-phase voltage regulator. FIG. 2E shows voltage $V_{SWA}$ that is a pulse waveform. Voltage $V_{SWA}$ as shown in FIG. 2E and $V_{SWB}$ as shown in FIG. 2F are equal to voltage $V_{IN}$ half of the time and zero volts the other half of the time. When $V_{SWA}$ is high, $V_{SWB}$ is low. Similarly, when $V_{SWB}$ is high, $V_{SWA}$ is low.

Figure 2G:
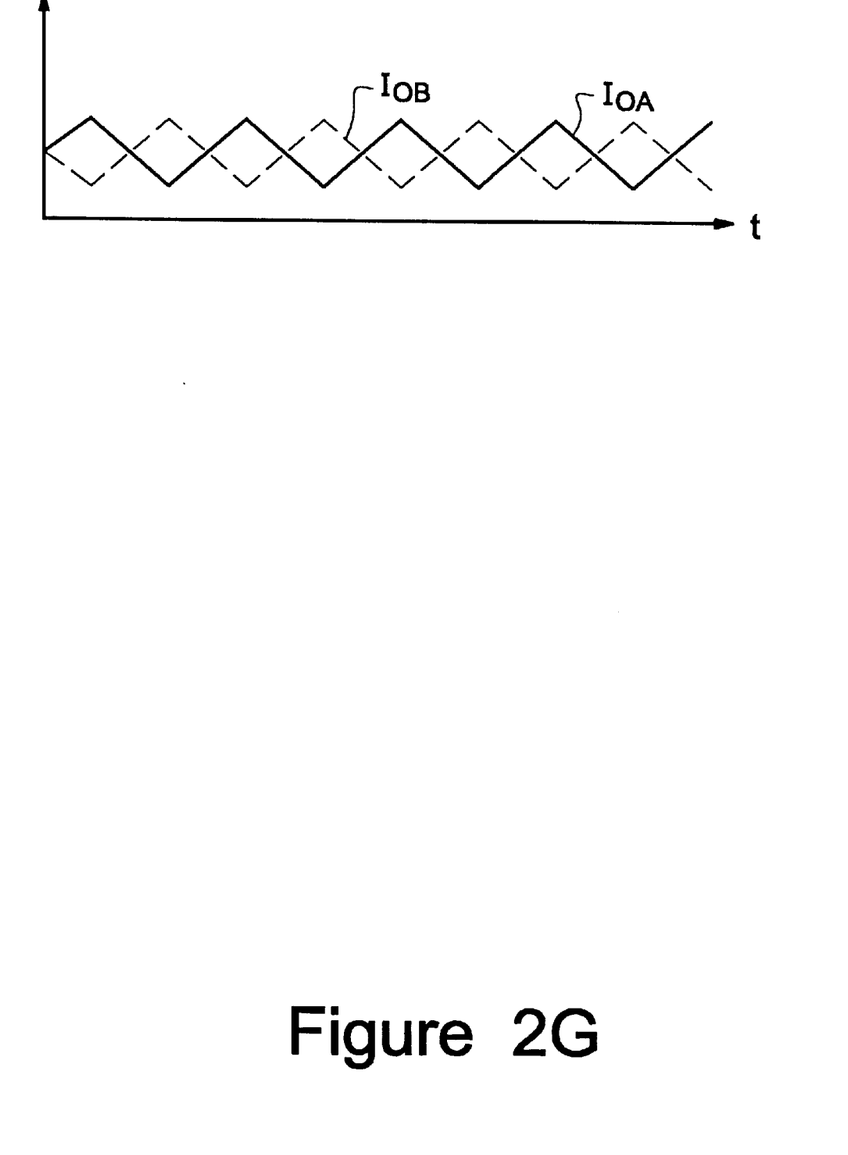
Figure 2H:
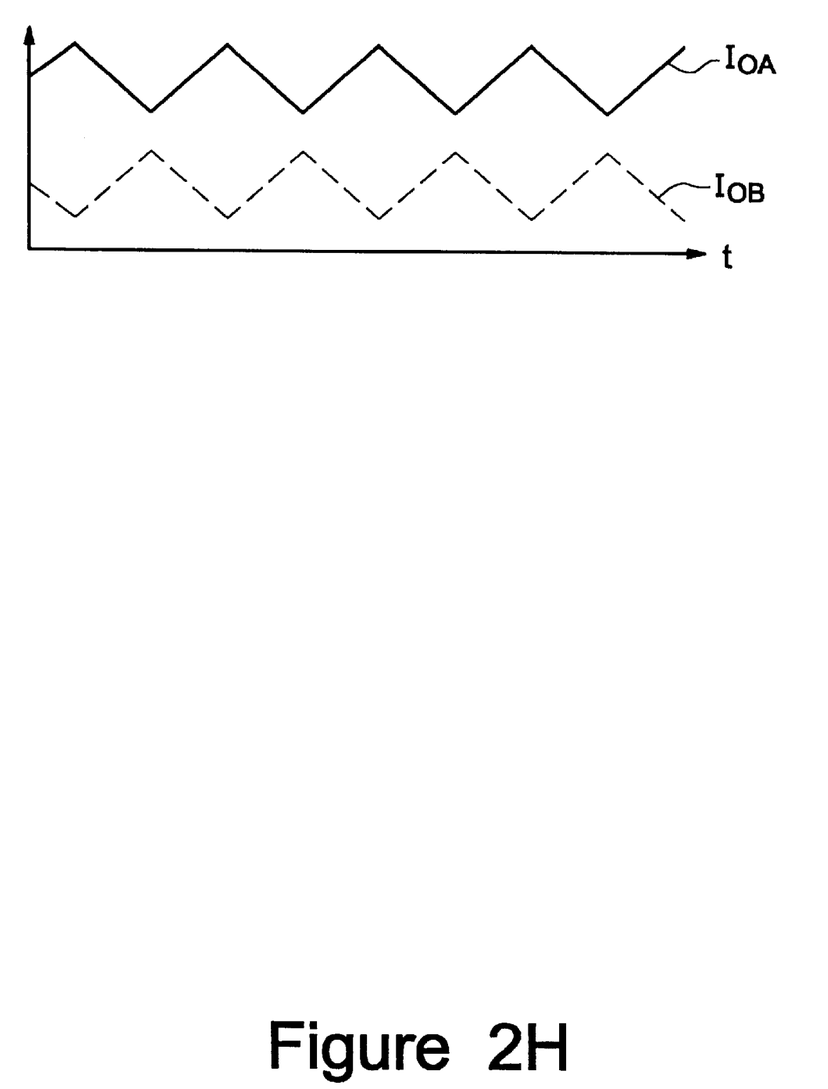

FIGS. 2G and 2H illustrate exemplary currents of a multiphase voltage regulator that provide the same voltage output. FIG. 2G shows the inductor currents of a multiphase voltage regulator when the DC currents are equal. FIG. 2G illustrates the ideal DC current for a multiphase regulator. In a multiphase regulator system, the DC currents of the inductors for each phase should be kept as equal as possible, so that none of the switch or component currents get too high. As can be seen by referring to FIG. 2G, the peaks of currents $I_{OA}$ and $I_{OB}$ are equal and the valleys of $I_{OA}$ and $I_{OB}$ are equal.

FIG. 2H illustrates currents $I_{OA}$ and $I_{OB}$ of a 2-phase system having unequal DC currents. FIG. 2H illustrates how the currents of a multiphase system that does not enforce current sharing may drift due to switch and other component mismatches. As can be seen by referring to FIG. 2H, currents $I_{OA}$ and $I_{OB}$ are at different levels. The $I_{OA}$ waveform is completely above the $I_{OB}$ waveform. While the sum of the DC components of currents $I_{OA}$ and $I_{OB}$ are equal to the total DC current component as illustrated in FIG. 2G, the DC components of current $I_{OA}$ and current $I_{OB}$ are not the same. The drift in the waveforms illustrated in FIG. 2H causes a designer to have to choose components for their system that must operate at a higher current level than if there was no drift in the waveforms (See FIG. 2G). Additionally, smaller components have other advantages over larger components. For example, the cost is lower, the size of the circuit boar is smaller, less heat sinking is needed, and the like.

Without the current sensing circuit as illustrated in FIG. 1, the voltage mode multiphase regulator system illustrated would have no way of keeping the DC components of $I_{OA}$ and $I_{OB}$ equal. As a result, the waveforms for $I_{OA}$ and $I_{OB}$ could end up looking like FIG. 2H. The voltage mode system illustrated in FIG. 1 enforces current sharing among the different inductors for each of the phases, resulting in waveforms similar to FIG. 2G.

Figure 3:
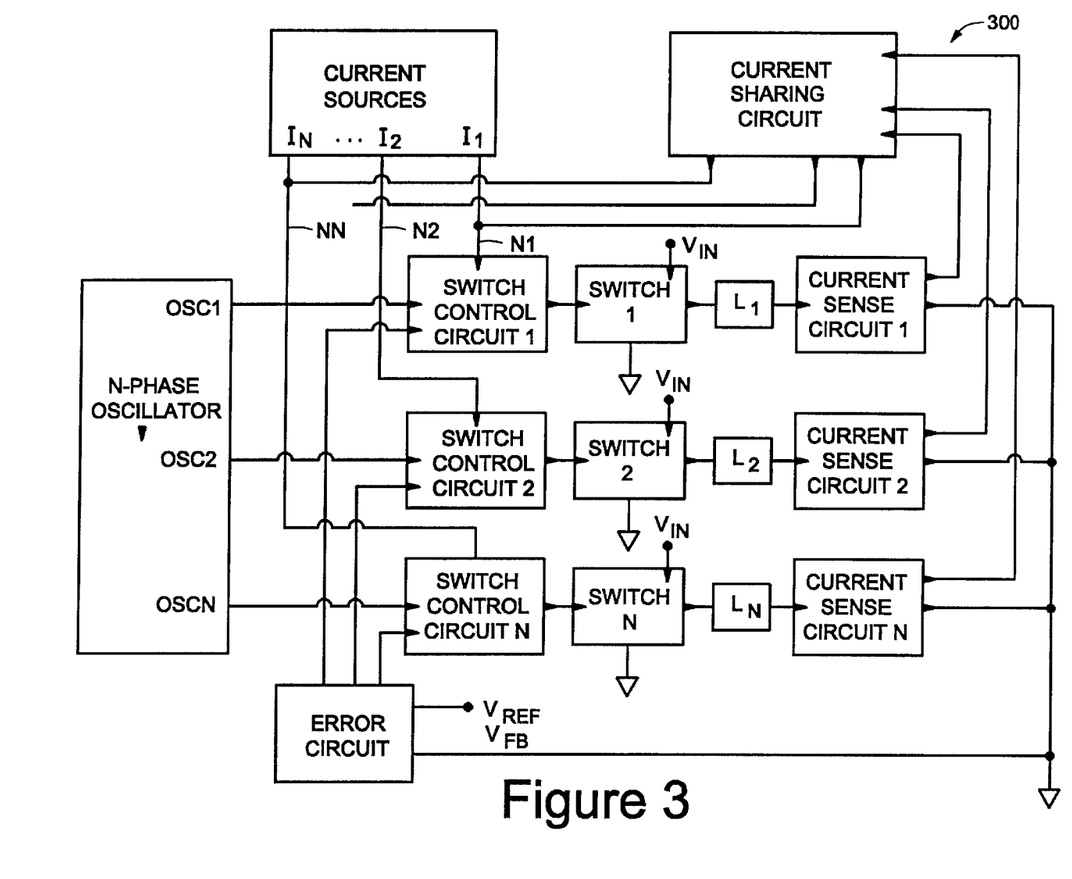
FIG. 3 illustrates an overview schematic of an N-phase switching regulator that enforces current sharing.

FIG. 3 shows an overview schematic diagram of an N-phase switching regulator architecture having low on-times that enforces current sharing, in accordance with aspects of the invention. As shown in the figure, N-phase switching regulator architecture 300 includes an N-phase oscillator, current sources 1–N, current sharing circuit, current sense circuits 1–N, switches 1–N, switch control circuits 1–N, error circuit, and inductors $L_1$–$L_N$.

Since the components of each leg of the N-phase switching regulator architecture 300 are similar, only one leg's connections will be described. Switch control circuit 1 has an input coupled to current source $I_1$, an input coupled to N-phase oscillator output OSC1, an input coupled to error circuit, and an output coupled to switch 1. Switch 1 has an input coupled to a signal ($V_{IN}$), an output coupled to ground, and an output coupled to inductor $L_1$. Inductor $L_1$ is coupled between switch 1 and current sense circuit 1. Current sense circuit 1 has an input coupled to the output of inductor $L_1$, an output coupled to a common node for all of the legs, and an output coupled to current sharing circuit. Current sharing circuit has an output coupled to current source $I_1$. Error circuit has an input coupled to the common node, an input coupled to a reference signal ($V_{REF}$) and an output coupled to switch control circuits 1. The connections for legs 2–N may be similarly made.

The operation of N-phase switching regulator architecture 300 will now be described. N-phase switching regulator 300 enforces current sharing for each leg of the N-phases. Each of the switch control circuits produce a switch control signal to control operation of the switch circuits (Switch 1–N). In response to the switch control signals, switch circuits 1–N selectively couple signal $V_{IN}$ or ground to the node between the switch circuits and the inductors, respectively. Each of the current sense circuits (Current sense circuits 1–N) sense the current relating to the inductor associated with the phase and output a sense signal to current sharing circuit. The current sharing circuit compares each of the sense signals to an average current. The average current is the average of all of the phase's sensed currents. Current sharing circuit produces compensation signals in response to the comparison. The compensation signal is used to adjust the current for each of the phases. When a phase's sensed current is higher or lower than the average current, the level of the compensation signal is adjusted higher or lower to help control the phase's inductor current. According to one embodiment of the invention, the compensation signal is used to adjust the on time of the switch for the phase. Adjusting the switch on time affects the inductor current level for the phase. For example, when current sense circuit 1 determines its sensed current is higher than the average current, the current sharing circuit decreases the on time for Switch 1 by supplying a compensation signal that raises the current level at node N1. When current sense circuit 2 determines its current is lower than the average current, current sharing circuit increases the on time for Switch 2 by supplying a compensation signal lowers the current level at node N2. This sensing and comparing process is completed for each of the N-phases. When the sensed current is equal to the average current no adjustment to the currents at nodes N1–NN are made.

Figure 4:
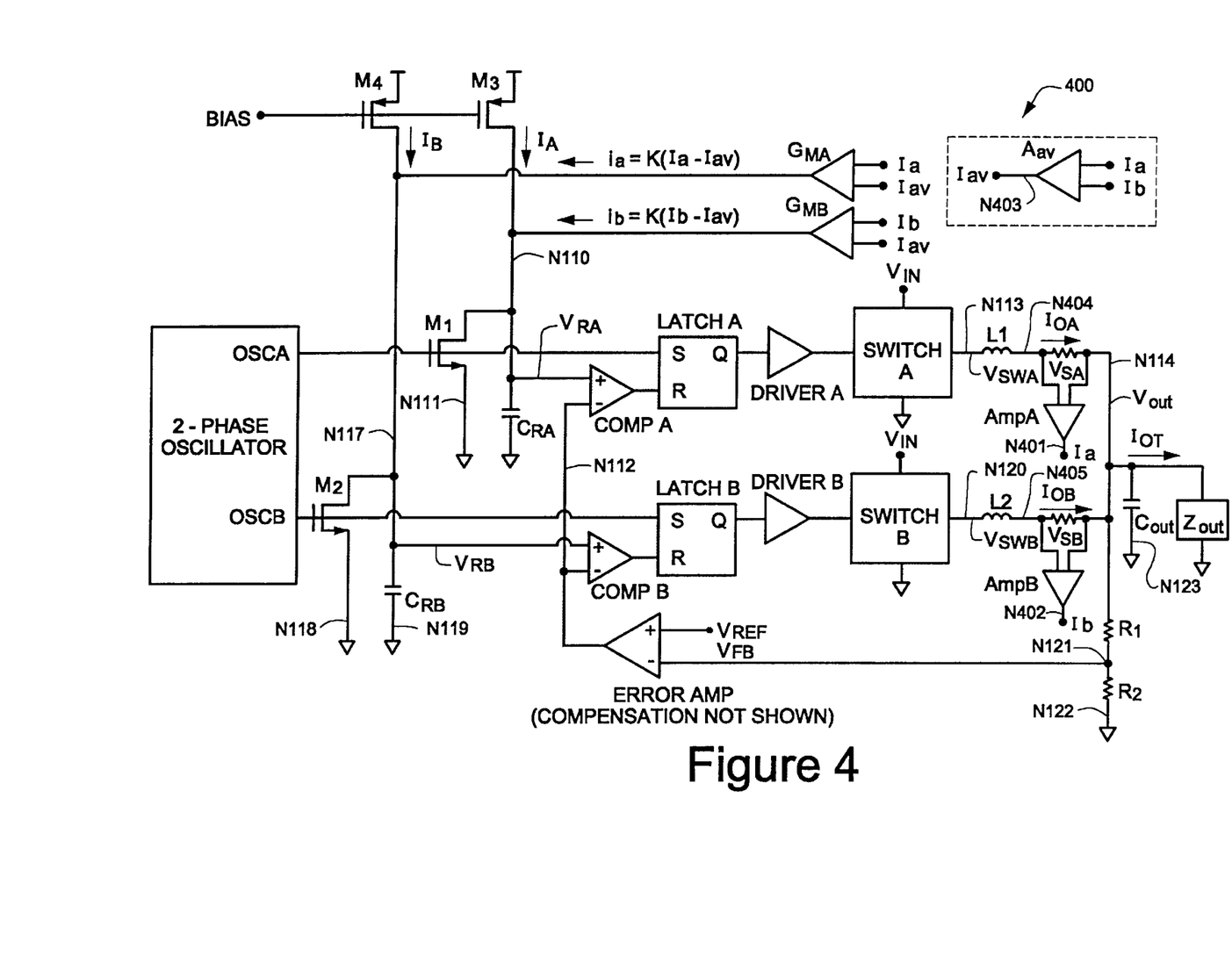
FIG. 4 illustrates a schematic of a two-phase switching regulator that enforces current sharing.

FIG. 4 shows a multiphase switching regulator architecture for low on-time systems that enforces current sharing. The components in multiphase switching regulator architecture 400 are substantially similar to the components in the regulator architecture illustrated in FIG. 1. More detail, however, has been added to multiphase switching regulator architecture 400. As shown in the figure, multiphase switching regulator architecture 400 includes the additional components of gm amplifier circuits $G_{MA}$ and $G_{MB}$, resistors $R_{SA}$ and $R_{SB}$, and amplifier circuit $A_{AVG}$. Multiphase switching regulator 400 does not include the current sharing circuit illustrated in FIG. 1.

The connections that are different from the connections illustrated in FIG. 1 will now be discussed. Amplifier circuit $G_{MA}$ has an input coupled to node N401, an input coupled to node 403, and an output coupled to node N110. Amplifier circuit $G_{MB}$ has an input coupled to node N402, an input coupled to node N403, and an output coupled to node N117. Resistor $R_{SA}$ is coupled between node N114 and node N404. Resistor $R_{SB}$ is coupled between node N114 and node N405. Amplifier circuit AmpA has an input coupled to node N114, an input coupled to node N404, and an output coupled to node N401. Amplifier circuit AmpB has an input coupled to node N114, an input coupled to node N405, and an output coupled to node N402.

The operation of multiphase switching regulator architecture 400 will now be described. As the main operation of a voltage mode system that enforces current sharing has been described with regard to FIG. 1, the main differences between the systems will be described.

By sensing the voltage drop across resistor $R_{SA}$, amplifier circuit AmpA produces a sense signal (current $I_A$) at node N401 that is proportional to current $I_{OA}$. Similarly, by sensing a voltage drop across resistor $R_{SB}$, amplifier circuit AmpB produces a sense signal (current $I_B$) at node N402 that is proportional to current $I_{OB}$. Amplifier circuit $A_{AVG}$ produces current $I_{AVG}$ at node 403 that is the average of currents $I_A$ and $I_B$. Next, amplifier circuit $G_{MA}$ produces compensation signal (current $i_a$) at node N110 which is proportional to the difference between current $I_A$ and current $I_{AVG}$. Similarly, amplifier circuit $G_{MB}$ produces compensation signal (current $i_b$) at node N117, which is proportional to the difference between current $I_B$ and current $I_{AVG}$. When current $I_{OA}$ is equal to current $I_{OB}$, then current $I_A$ equals current $I_B$ and current $I_{AVG}$. When the currents are equal, there is perfect current sharing among the different phases causing currents $i_a$ and $i_b$ to be zero.

When current $I_{OA}$ goes higher than current $I_{OB}$, current $i_a$ increases above zero and current $i_b$ decreases below zero. When current $i_a$ is above zero and current $i_b$ is below zero, the $V_{RA}$ voltage ramps faster than the $V_{RB}$ voltage. The on time for SwitchA is less than the on time for Switch B due to the faster $V_{RA}$ voltage ramp. When the on time for SwitchA decreases, the current level of $I_{OA}$ decreases and the current level of $I_{OB}$ increases, thereby equalizing the currents. Amplifier circuits $G_{MA}$ and $G_{MB}$ equalize $I_{OA}$ and $I_{OB}$ using this current feedback mechanism. Similarly, when current $I_{OB}$ is higher than current $I_{OA}$, the on time of SwitchB is less than the on time of SwitchA. Decreasing the switch on time for SwitchB causes the current level of $I_{OB}$ to decrease and the current level of $I_{OA}$ to increase until $I_{OA}$ and $I_{OB}$ are equal.

Figure 5:
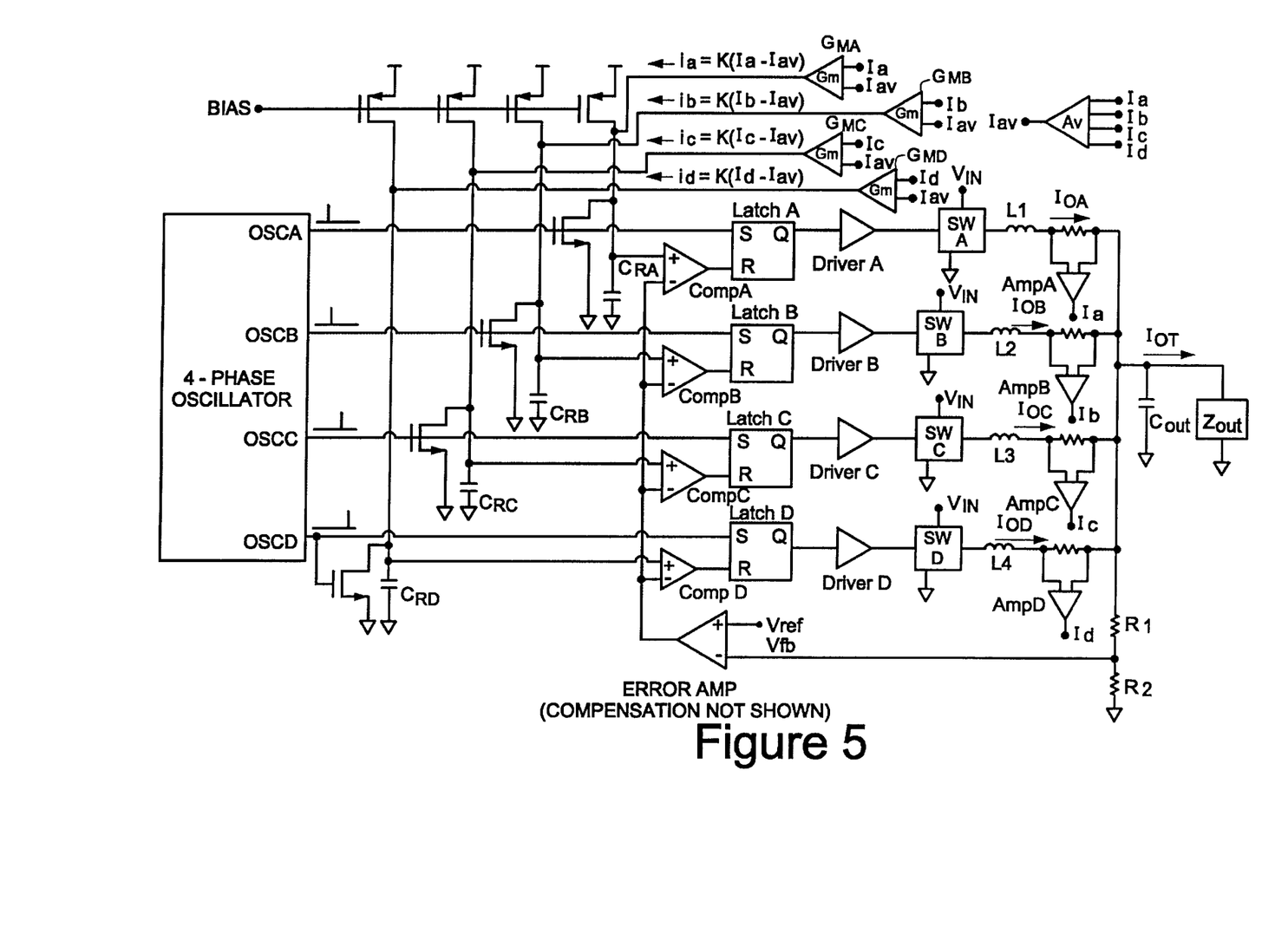
FIG. 5 illustrates a schematic of a four-phase switching regulator that enforces current sharing.

FIG. 5 illustrates a 4-phase system that enforces current sharing. The components of FIG. 5 are substantially similar to the components in FIG. 5. The 4-phase current sharing system includes an additional transistor, capacitor, comparator, latch, driver, switch, inductor, resistor, sense amplifier, and GM amplifier for each phase added beyond the 2-phase system illustrated in FIG. 4. Additionally, the 2-phase oscillator illustrated in FIG. 4 has been replaced by a 4-phase oscillator having 4 outputs (OSCA, OSCB, OSCC and OSCD).

The operation of the 4-phase current sharing system is substantially similar to the system as illustrated in FIG. 4. The current feedback mechanism in the 4-phase regulator system attempts to equalize four (4) currents to equal each other instead of the two currents illustrated in FIG. 4. As discussed above with reference to FIG. 3, the current feedback mechanism may be used with any number of phases.

Figure 6:
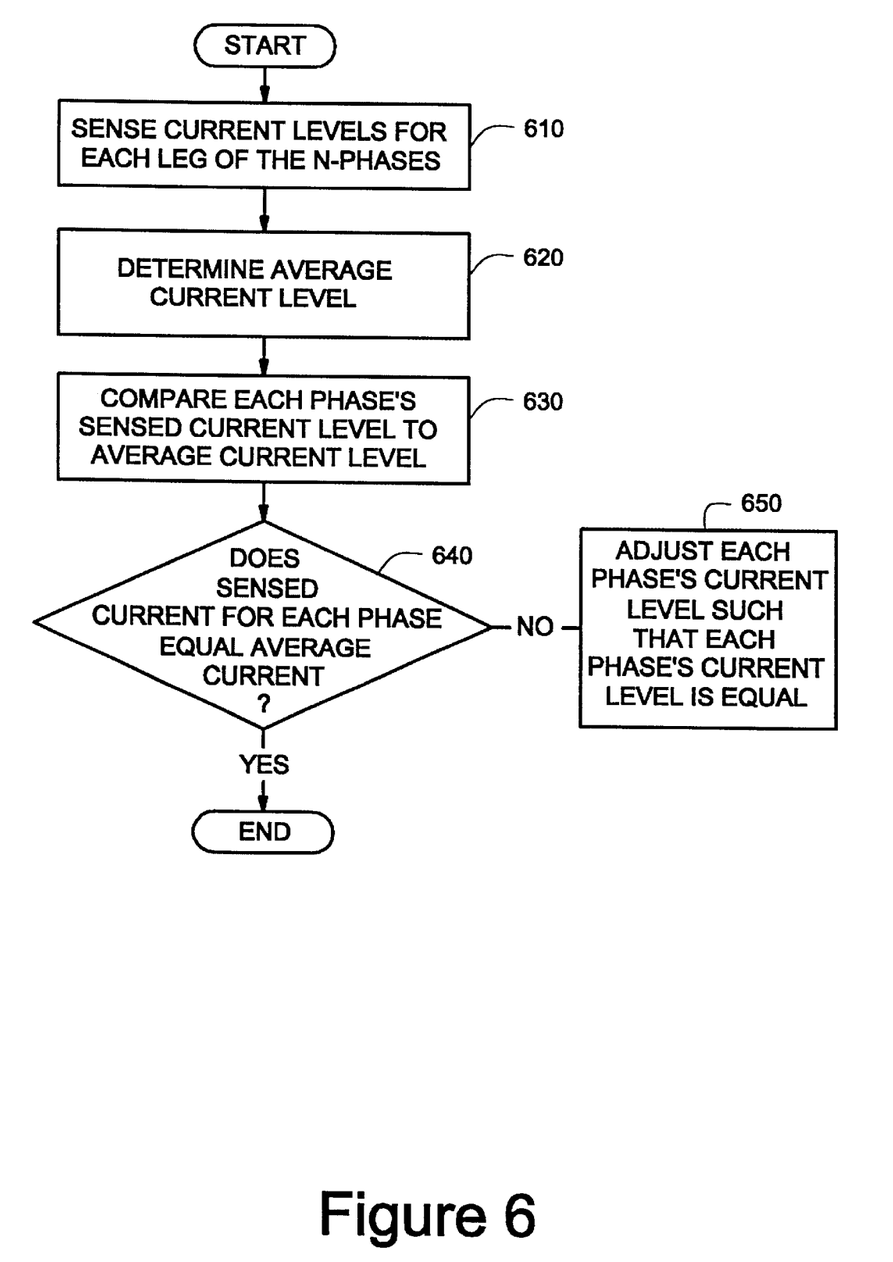
FIG. 6 illustrates a logical flow for a process that enforces current sharing of an N-phase switching regulator, in accordance with aspects of the invention.

FIG. 6 illustrates a logical flow for a process that enforces current sharing of an N-phase switching regulator, in accordance with aspects of the invention. After a start block, the process moves to block 610, at which point the logic senses a current level associated with each leg of the N-phases. According to one embodiment of the invention, a current level relating to the inductor for each phase is sensed. Moving to block 620, an average current level of all of the legs of the N-phase current levels is determined. For example, for a 2-phase system, the average current is the current of phase one plus the current of phase two divided by two. Stepping to block 630, the average current is compared to each of the sensed current levels. Moving to decision block 640, a determination is made as to whether a current level for a phase does not equal the average current. When the current level is not equal to the average, the process transitions to block 650, at which point the logic adjusts the current level of the phase. According to one embodiment of the invention, the switch on time is adjusted to affect the phase's current level. For example, the switch on-time time may be increased or decreased to equalize the currents. According to one embodiment, the switch on time decreases when a phase's current is higher than the average current. The lower on time for the switch results in the phase's sensed current to drop as compared to the previous measurement of the sensed current for the phase. When the current level is equal to the average, the process moves to an end block and terminates.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for a multiphase switching regulator control architecture that has low on time and enforces current sharing, comprising:

an oscillator circuit configured to produce a first oscillation signal corresponding to a first phase and a second oscillation signal corresponding to a second phase;

a control circuit that includes a first input that is coupled to the first oscillation signal, a second input that is coupled to the second oscillation signal, a third input that is coupled to an error signal, a fourth input that is coupled to a first node, the first node coupled to a first current source, a fifth input that is coupled to a second node, wherein the second node is coupled to a second current source, a first output that is arranged produce a first control signal in response to the first current source, the first oscillation signal, and the error signal, and a second output that is arranged to produce a second control signal in response to the second current source, the second oscillation signal, and the error signal;

a switching circuit that includes a first input that is coupled to the first output of the control circuit, a second input that is coupled to the second output of the control circuit, a first output that is arranged to couple a first signal to a third node in response to the first control signal, and a second output that is arranged to couple a second signal to a forth node in response to the control signal;

a first inductor that is coupled between the third node and a fifth node;

a second inductor that is coupled between the fourth node and a sixth node; and a current sharing circuit that includes a first input that is coupled to the fifth node, a second input that is coupled to the sixth node, a first output that is arranged to produce a first compensation signal at the first node; and a second output that is arranged to produce a second compensation signal at the second node; wherein the first compensation signal and second compensation signal are used to equalize a first current relating to the first phase and a second current relating to the second phase.

2. The apparatus of claim 1, wherein the control circuit, further comprises:
   a first switch control circuit that has a first input coupled to the first node, a second input that is coupled to the error signal, a third input that is coupled to the first oscillation signal, and an output that is arranged to produce a first switch control signal;
   a first switch circuit that includes a first input that is coupled to a first signal, a second input that is coupled to the output of the first switch control circuit; and an output that is arranged to selectively couple the first signal in response to the first switch control signal;
   a second switch control circuit that has a first input coupled to the second node, a second input that is coupled to the error signal, a third input that is coupled to the second oscillation signal, and an output that is arranged to produce a second switch control signal; and
   a second switch circuit that includes a first input that is coupled to a second signal, a second input that is coupled to the output of the second switch control; and an output that is arranged to selectively couple the second signal in response to the second switch control signal.

3. The apparatus of claim 2, wherein the first switch control circuit, further comprises:
   a first transistor circuit that is coupled to the first node, the first oscillation signal; and a ground;
   a first capacitor circuit that is coupled between the first node and the ground;
   a first comparator circuit that includes a first input coupled to the first node, a second input coupled to the error signal; and an output that is arranged to produce a first reset signal.

4. The apparatus of claim 3, wherein the second switch control circuit, further comprises:
   a second transistor circuit that is coupled to the second node, the second oscillation signal; and the ground;
   a second capacitor circuit that is coupled between the second node and the ground; and
   a second comparator circuit that includes a first input that is coupled to the second node, a second input that is coupled to the error signal; and an output that is arranged to produce a second reset signal.

5. The apparatus of claim 4, further comprising:
   a first latch circuit that includes a first input that is coupled to the first oscillation signal, a second input that is coupled to the output of the first comparator circuit, and an output that is arranged to produce a first driver signal in response to the first reset signal and the first oscillation signal; and
   a second latch circuit that includes a first input that is coupled to the second oscillation signal, a second input that is coupled to the output of the second comparator circuit, and an output that is arranged to produce a second driver signal in response to the second reset signal and the second oscillation signal.

6. The apparatus of claim 5, further comprising:
   a first driver circuit that includes an input that is coupled to the output of the first latch circuit, and an output that is arranged to produce the first switch control signal in response to the first driver signal; and
   a second driver circuit that includes an input that is coupled to the output of the second latch circuit, and an output that is arranged to produce the second switch control signal in response to the second driver signal.

7. The apparatus of claim 6, wherein the first latch circuit is set based on the first oscillation signal and is reset based on a comparison between a reference signal and an output signal.

8. The apparatus of claim 6, wherein the current sharing circuit, further comprises:
   a first resistor circuit that is coupled between the fifth node and a seventh node;
   a first amplifier circuit that includes a first input that is coupled to the fifth node, a second input that is coupled to the seventh node, and an output that is arranged to produce a first sense signal in response to the first input of the first amplifier circuit and the second input of the first amplifier circuit; and
   a second resistor circuit that is coupled between the sixth node and an eighth node; and
   a second amplifier circuit that includes a first input that is coupled to the sixth node, a second input that is coupled to the eighth node, and an output that is arranged to produce a second sense signal in response to the first input of the second amplifier circuit and the second input of the second amplifier circuit.

9. The apparatus of claim 8, wherein the current comparing circuit, further comprises:
   a first comparing amplifier circuit that includes a first input that is coupled to the output of the first amplifier circuit, a second input that is coupled to an average signal, and an output that is arranged to produce the first compensation signal in response to a comparison of the average signal with the first sense signal; and
   a second comparing amplifier circuit that includes a first input that is coupled to the output of the second amplifier circuit, a second input that is coupled to the average signal, and an output that is arranged to produce the second compensation signal in response to a comparison of the average signal and the second sense signal.

10. An apparatus for a voltage mode N-phase switching regulator control architecture that includes N phases and has low on time and enforces current sharing, comprising:
    an N-phase oscillator that includes N outputs, wherein each one of the N outputs is arranged to produce one of N oscillation signals;
    N switch control circuits, wherein each of the N switch control circuits include a first input that is coupled to a corresponding one of the N oscillation signals, a second input that is coupled to a corresponding one of N current sources; a third input that is coupled to an error signal; and an output that is arranged to produce one of N switch control signals;
    N switch circuits, wherein each of the N switch circuits each include an input coupled to a corresponding one of the N switch control signals and an output that is arranged to selectively couple a signal to one of a first set of N nodes;
    N inductor circuits, wherein each of the N inductor circuits are coupled between a corresponding one of the first set of N nodes and a corresponding one of a second set of N nodes;

N current sense circuits, wherein each of the N current sense circuits include an input that is coupled to the corresponding one of the second set of N nodes, a first output that is coupled to a common node; and a second output that is arranged to produce one of N sense signals; and a current sharing circuit that includes N inputs and N outputs, wherein each one of the N inputs is coupled to a corresponding one of the N sense signals, and each one of the N outputs is arranged to produce one of N compensation signals, the one of N compensation signals affecting the corresponding one of the N current sources in response to a comparison between the corresponding one of the N sense signals with an average signal.

11. The apparatus of claim 10, wherein the N switch control circuits, further comprise:

N transistor circuits, wherein each one the N transistor circuits is arranged to direct the corresponding one of the N current sources;

N capacitor circuits, wherein each one of the N capacitor circuits is arranged to charge and discharge in response to a corresponding one of the N transistor circuits;

N comparator circuits, wherein each one of the N comparator circuits include a first input coupled to the corresponding one of the N current sources and to a corresponding one of the N capacitor circuits, a second input coupled to the error signal; and an output that is arranged to produce one of N reset signals.

12. The apparatus of claim 11, further comprising N latch circuits, wherein each of the N latch circuits include a set input that is coupled to the corresponding one of the N oscillation signals, a second input that is coupled to the output of a corresponding one of the N comparator circuits, and an output that is arranged to produce one of N driver signals in response to a corresponding one of the N reset signals and the corresponding one of the N oscillation signals.

13. The apparatus of claim 10, wherein the N current sense circuits, further comprise:

N resistor circuits, wherein each one of the N resistor circuits is coupled between the corresponding one of the second set of N nodes and a corresponding one of a third set of N nodes; and N amplifier circuits, wherein each of the N amplifier circuits includes a first input coupled to the corresponding one of the second set of N nodes, and a second input coupled to the corresponding one of the third set of N nodes, and an output that is arranged to produce the one of N sense signals.

14. The apparatus of claim 13, wherein the a current sharing circuit, further comprises:

N comparing amplifier circuits, wherein each of the N comparing amplifier circuits include a first input that is coupled to the corresponding one of the N sense signals, a second input that is coupled to the average signal; and an output that is arranged to produce the corresponding one of the N compensation signals.

15. The apparatus of claim 13, wherein the N comparing amplifier circuits add current to the corresponding one of the N current sources when the corresponding one of the N sense signals is larger than the average signal.

16. A method for enforcing current sharing for a multiphase switching regulator that has low on time, comprising:

sensing a first current level, wherein the first current level corresponds to a first phase of the multiphase switching regulator;

sensing a second current level, wherein the second current level corresponds to a second phase of the multiphase switching regulator;

determining an average current level;

comparing the first current level to the average current level;

comparing the second current level to the average current level; and adjusting the first current level based on the comparison between the first current level to the average current level; and adjusting the second current level based on the comparison between the second current level to the average current level.

17. The method of claim 16, wherein adjusting the first current level based on the comparison between the first current level to the average current level further comprises determining when the first current level is greater than the average current level; determining when the first current level is less than the average current level; and wherein adjusting the second current level based on the comparison between the second current level to the average current further comprises determining when the second current level is greater than the average current level; and determining when the second current level is less than the average current level.

18. The method of claim 17, wherein the first current level is increased when the first current level is greater than the average current level and the first current level is decreased when the first current level is less than the average current level; and wherein the second current level is increased when the second current level is greater than the average current level and the second current level is decreased when the second current level is less than the average current level.

19. An apparatus for an N-phase switching regulator architecture that includes N phases and has low on time and enforces current sharing, comprising:

a means for sensing N current levels, wherein each one of the N current levels corresponds one of the N phases;

a means for determining an average current level relating to the N phases;

a means for comparing the N current levels to the average current level; and a means for adjusting the N current levels based on the comparison such that current sharing is enforced for the N-phase switching regulator.

* * * * *